United States Patent [19]

Varner et al.

[11] Patent Number: 5,221,068
[45] Date of Patent: Jun. 22, 1993

[54] VEHICULAR MIRROR MOUNT

[75] Inventors: Donald D. Varner, Danville; Rolin J. Gebelein, Santa Cruz, both of Calif.

[73] Assignee: Blue Sky Research, Inc., San Jose, Calif.

[21] Appl. No.: 615,476

[22] Filed: Nov. 19, 1990

[51] Int. Cl.⁵ .................................................. A47B 96/06
[52] U.S. Cl. .............................. 248/231.4; 359/876; 248/482; 248/485
[58] Field of Search .............. 248/231.4, 475.1, 481, 248/485, 487, 482; 359/871, 874, 876

[56] References Cited

U.S. PATENT DOCUMENTS

| | | | |
|---|---|---|---|
| 808,602 | 12/1905 | Fergusson | 248/231.4 |
| 2,649,142 | 8/1953 | New | 248/231.4 X |
| 3,236,152 | 2/1966 | Alford | 248/481 |
| 3,751,140 | 8/1973 | Berlin | 248/481 X |
| 3,790,117 | 2/1974 | Winkler | 248/231.4 |
| 4,111,532 | 9/1978 | Budish | 248/481 X |
| 4,208,104 | 6/1980 | Peterson | 248/487 X |
| 4,637,694 | 1/1987 | Castaneda | 248/487 X |
| 4,863,254 | 9/1989 | Dyer | 359/871 X |
| 4,892,401 | 1/1990 | Kittridge | 359/871 X |

Primary Examiner—J. Franklin Foss

[57] ABSTRACT

A mounting device with a clamp and pivotal holders provides mounting to a vehicular rear-view mirror for complementary devices such as a magnification scope or a radar detection device. Hand-held mounting is provided as well.

8 Claims, 7 Drawing Sheets 4,221,068

VEHICULAR MIRROR MOUNT

FIELD OF THE INVENTION

This invention is in the field of apparatus and methods for mounting viewing aids in vehicles, such as complementary apparatus associated with a rear-view mirror.

CROSS REFERENCE TO RELATED APPLICATIONS

The present invention is related to application Ser. No. 07/453,581 as an apparatus and method to facilitate use of the invention of the referenced application.

BACKGROUND OF THE INVENTION

In a separate invention known to the present inventor an optical magnification unit is provided for selectively viewing to the rear for vehicle operators. The viewing unit is a telescopic device called a "Magniscope" using a lenses and internal mirrors, and lets an operator view selected fields to the rear of the vehicle in magnification. The internal mirrors provide an optical path length consistent with the focal length of optics in the Magniscope. Because the Magniscope views to the rear of a vehicle and an operator looks to the front, another reflection of what the Magniscope "sees" is needed for the magnified image to be useful to the vehicle operator.

To minimize costs for the Magniscope and to maximize its utility, a mounting apparatus and method is needed to incorporate the Magniscope with existing internal rear-view mirrors. By doing so, much of the original function of the existing rear-view mirror is retained, space is saved, the complexity and cost of the Magniscope is minimized, and the windshield area of the vehicle is less obstructed than might be the case otherwise.

There are also situations in vehicles where mounting to an existing mirrr is not practical, for example in a van or a truck where only outside mirrors may be used, and there is no central rearview mirror. A way to use a magniscope in this instance is needed, and in some situations, a hand-held device may be useful.

There are devices known in the art that may also usefully be incorporated in a mounting system for a Magniscope, such as other utility mirrors and radar detection devices.

SUMMARY OF THE INVENTION

In a preferred embodiment an apparatus is provided for mounting a complementary device to a rear-view mirror of a vehicle. The apparatus has an adjustably opposed clamp with an upper portion and a lower portion, the upper portion for engaging the top and the lower for engaging the bottom of a rear-view mirror. A support extends from the clamp and supports a pivotal mount at the end opposite the clamp to engage a complementary device to be mounted to the mirror.

In a preferred embodiment the support is a rod fixed to a portion of the clamp, and a collar with a post engages the rod and is rotatable about the rod to position the post vertically. The complementary device has a bore to engage the post.

The mounting provides for positioning the device to be mounted in a horizontal plane and allows the device to be aimed independently of the mirror position. In the preferred embodiment the clamp is configured to span the adapter by which the rear-view mirror is attached to the inside of a vehicle.

In an alternative preferred embodiment the support is rotatable where it is attached to the clamp, so the pivotal mount need not be rotatable about the support. In another alternative preferred embodiment a universal joint is joined to the support, and the device is mounted to the universal joint. In yet another embodiment the support is joined to the clamp by a universal joint, and a second universal joint mounts the device at the other end of the support. This embodiment has the advantage of being movable to not interfere with use of a passenger-side visor.

A method is provided in the invention for damping vibration by preloading the assembly between the rear-view mirror and the device, or between the rear-view mirror and the mounting apparatus. The damping preloading is also made adjustable to compensate for varying conditions of vibration.

Finally an embodiment is provided for the device to be hand held, either on a platform configured for that purpose, or by applying necessary components to the case of the device.

The invention provides for mounting a device, such as a magnifying viewing device for looking to the rear of a vehicle, to the inside of the vehicle to be of maximum use to an operator, and also for using such a device by holding in the hand when needed.

DESCRIPTION OF THE PREFERRED EMBODIMENTS

Figure 1:
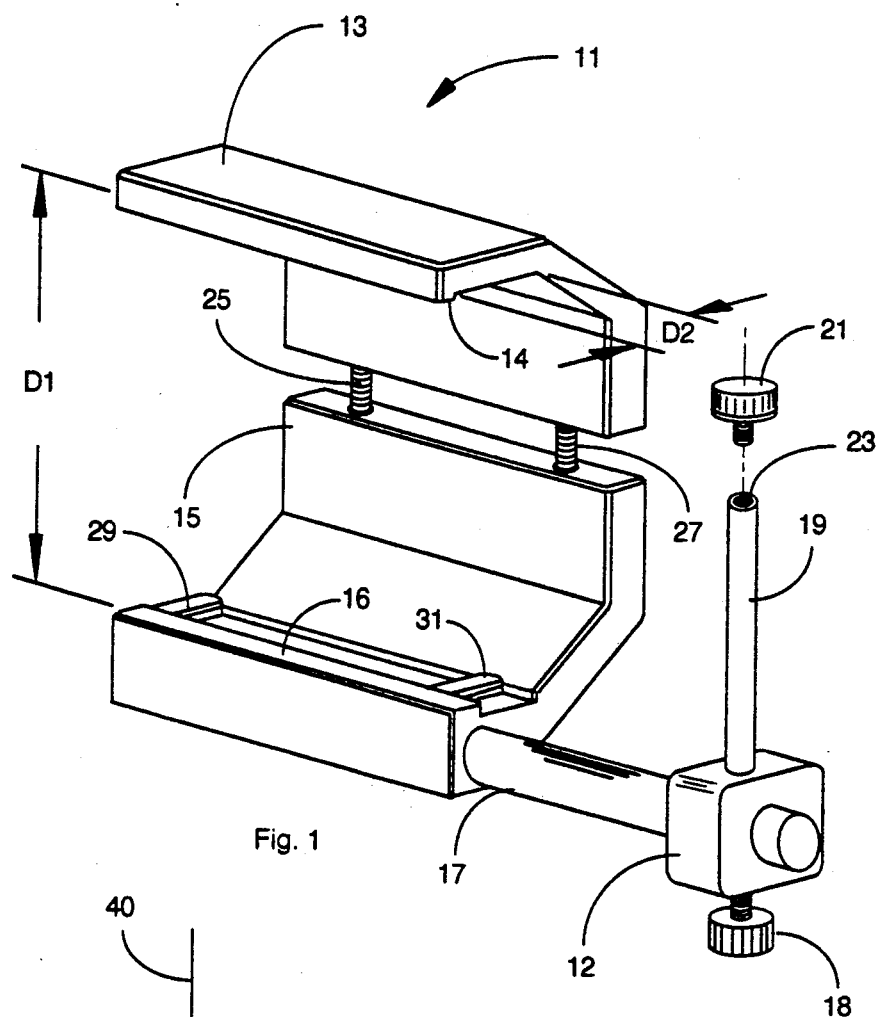
FIG. 1 is a perspective view of a mounting apparatus according to a preferred embodiment of the invention.

FIG. 1 is a partially exploded perspective view of a mounting apparatus 11 according to a preferred embodiment of the invention, for adapting a complementary device such as Magniscope to an existing rear-view mirror in a vehicle.

In this preferred embodiment the mounting apparatus has a clamp consisting of an upper portion 13 and a lower portion 15, adjustably opposed by screws 25 and 27 passing pivotally through lower portion 15 and engaging threaded bores in upper portion 13. Threading from below is preferable, as the screw heads are more easily accessible from below when attaching the apparatus to a rear-view mirror. In the preferred embodiment the screws are of the locking type with a nylon or other polymer insert to avoid loosening in operation. Alternatively screws and nuts may be used or shafts fixed in one portion and engaged by set screws in the other. A person with skill in the art will see that there are many equivalent ways to oppose the portions and secure the clamp. In the preferred embodiment shown in FIG. 1 the upper and lower clamp portions have lips 14 and 16 respectively to help retain the clamp in the rear-view mirror.

The length of the fastening arrangement is such that the clamp may be made to span mirrors of many different sizes. Height D1 is adjustable from about 5 cm. in height to about 10 cm. The depth of the clamp D2 is about 2 cm. to be deep enough to engage most existing rear-view mirrors. The depth can be made smaller or greater in different embodiments of the invention, if needed.

A round support extension 17 extends from the lower clamp portion in the preferred embodiment, and a collar 12 with a locking screw 18 has a mounting post 19 for mounting a complementary device such as the Magniscope. The collar may be moved along the support extension and rotated about the extension to position the mounting for the device. It is not, of course, absolutely required that extension 17 extend from the lower clamp portion, it could, in some cases, extend from the upper portion. Extension 17 can be a molded part of the clamp portion from which it extends, or may attach by threaded engagement, force fit in a bore, or by other methods known in the art. In the preferred embodiment the body portions of the apparatus are injection molded of a suitable polymeric material, such as polycarbonate, although there are other suitable materials, and the body parts could also be metal molded or machined.

In the preferred embodiment shown in FIG. 1 flexible pads such as pads 29 and 31 are affixed to the inside surfaces of the clamp by gluing or other suitable technique. Similar pads are affixed inside the upper portion, but not seen in FIG. 1. The pads help avoid damage to a rear-view mirror and also help to damp vibration that might be troublesome.

Figure 2:
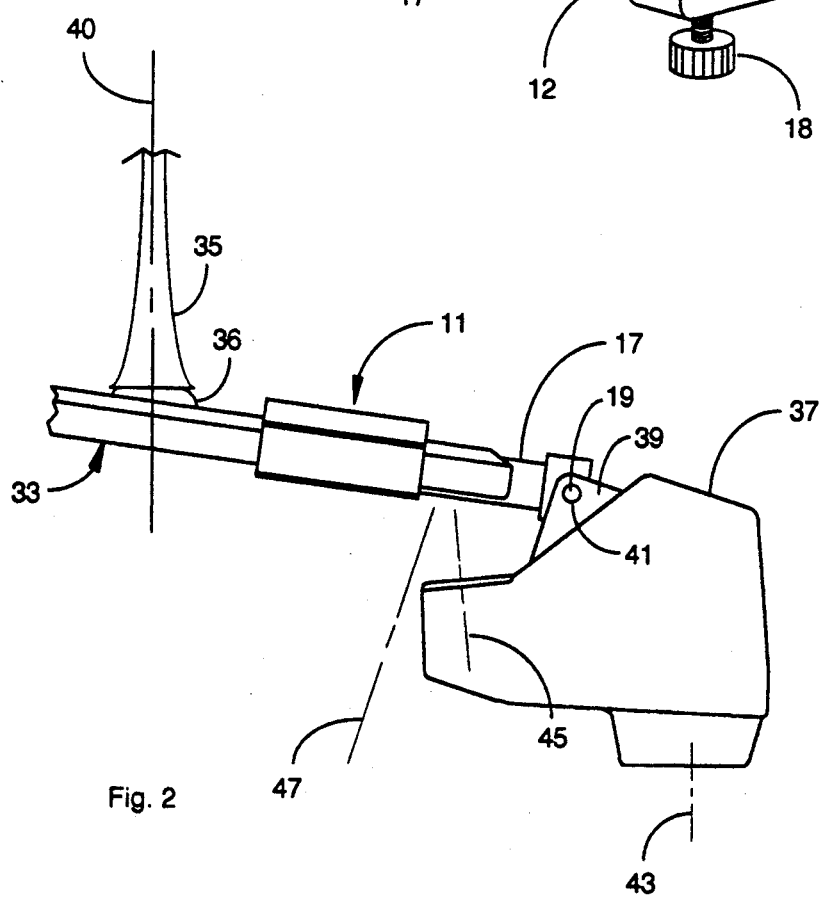
FIG. 2 is a plan view showing a complementary device mounted to a rear-view mirror using a mounting apparatus according to the invention.

FIG. 2 is a plan view of a rear-view mirror 33 on a conventional adapter 35 attached to an inside surface of a vehicle, with a mounting apparatus 11 according to the embodiment shown in FIG. 1 clamped to the mirror, and a Magniscope 37 is shown mounted on the mounting apparatus. The Magniscope in this example has an extension 39 with a bore 41 for engaging post 19. In this preferred embodiment bore 41 in extension 39 is slightly longer than the length of post 19, and a threaded cap 21 (shown in FIG. 1, but not shown in FIG. 2)) engages a threaded bore 22 in the top end of post 19 to clamp extension 39 between the cap and collar 12. Before the cap is secured, the Magniscope can be rotated about post 19 to align the scope to "see" a particular area behind the vehicle. Moreover, collar 12 may be moved along extension 17 and rotated around extension 17 to aid in positioning and aiming the Magniscope. In alternative embodiments the scope is secured to the post in other ways, such as by a set screw through extension 39 into bore 41 to bear against post 19. With such a set screw mounting, the Magniscope may also be adjusted vertically along the length of post 19.

FIG. 2 illustrates some important aspects of the invention relative to the mounting and aiming of devices such as the Magniscope described. The plan view of FIG. 2 is arranged so that line 40 is substantially "straight ahead" relative to the vehicle. Because in most vehicles with an unobstructed rear window, the mirror is mounted substantially at the center of the front windshield, the mirror, for the driver to use it properly, is nomally tilted somewhat toward the driver as indicated in the Figure. Also, the mirror is usually mounted somewhat above the eye level of the driver, to leave the view forward through the windshield relatively unobstructed. For this reason the plane of the reflective surface is usually tilted downward as well. Most conventional mirror mounts have a ball joint type mounting as indicated by element 36 to accomplish this tilting.

The Magniscope, however, needs to be aimed horizontally to the rear, and to be rotatable about a vertical axis to aim at different positions behind the vehicle, such as different lanes of traffic. For this to be so, with a post mounting for rotation as shown in FIG. 1, the post needs to be substantially vertical while the plane of the mirror is tilted downward and toward the driver. Rotation of collar 12 about extension 17 allows a driver to position the mirror and then to adjust the mounting post to be vertical for best operation of the Magniscope. Moving collar 12 along support extension 17 allows a driver to position the magnified image on the rear-view mirror without substantially changing the aiming of the Magniscope to the rear. A certain amount of adjustment of position in the left-to-right horizontal direction relative to the driver is beneficial for positioning the image on the rear-view mirror. Experience has shown that the movement needed is over a range of about 1 inch.

It is true that the embodiment of FIG. 1 to work effectively, the lengthwise axis of the mirror need be maintained substantially horizontal, so post 19 is not rotated away from horizontal in a plane not correctable b rotating collar 12. This, however, is relatively easy to do, as the rear-view mirror works to maximum effect when the horizontal axis of the mirror is maintained horizontal relative to the vehicle. Alternatively to the arrangement shown in FIGS. 1 and 2, the round support extension can be rotatable in a bore in the lower (or upper) clamp portion, and the collar can be fixed to the support extension. There are other equivalent ways that the mounting can be rotatable relative to the clamp so a mounted device can be adjusted without disturbing the position of the rear view mirror, or readjusted after changing the position of the rear-view mirror.

With the Magniscope aimed along line 43 as shown in FIG. 2, the magnified image is projected along line 45 and reflected from the mirror along line 47. Note that line 43 is not necessarily parallel with line 45. This is a function of the design of the Magniscope. Also, line 47 is not necessarily the line along which a driver normally looks to use the rear-view mirror. In the best preferred adjustment, line 47 passes to the right of a driver's normal eye position, and the driver can thus use the rear-view mirror with maximum effect without obstruction from the Magniscope. When the driver wants a magnified image via the magniscope, he or she leans a little to the right to intercept line 47, and thus gains a magnified image of a selected lane or field behind the vehicle.

Figure 3:
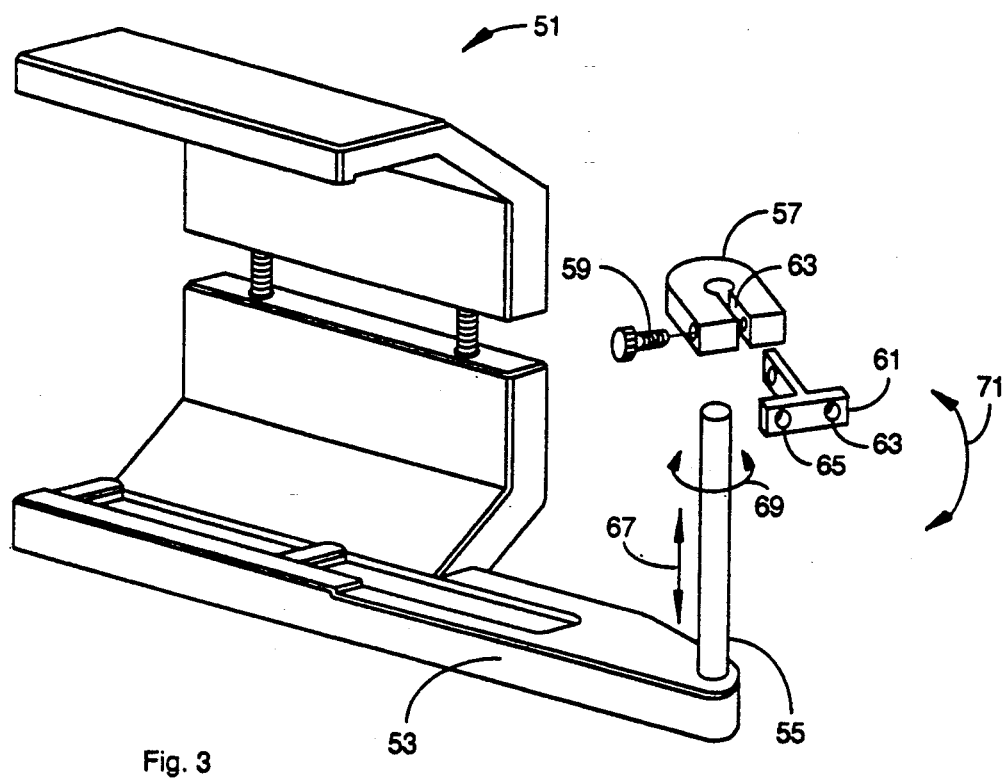
FIG. 3 is a perspective view of an apparatus according to an alternative embodiment of the invention.

FIG. 3 is a perspective view of a mounting apparatus 51 in an alternative preferred embodiment of the invention, with a rigid support extension 53 extending from the lower clamp portion supporting a mounting post 55. In this embodiment post 55 cannot be normally maintained in a vertical position because of necessary adjustment of the plane of the reflective surface of the rear-view mirror. To compensate, a sliding clamp 57 with a clamp screw is provided to engage post 55, and a rocking arm 61 engages a slot 63 in the sliding clamp, and is held by the same clamp screw 59. Holes 63 and 65 are for attaching to a mounting pad (not shown) on a Magniscope or other complementary device.

Clamp 57 can be moved along post 55 (arrow 67) to adjust the height of a device and rotated about post 55 (arrow 69) to adjust the aim to the rear. Rocking arm 61 can be rotated in slot 63 (arrow 71) to adjust the magniscope or other mounted device for level.

Figure 4:
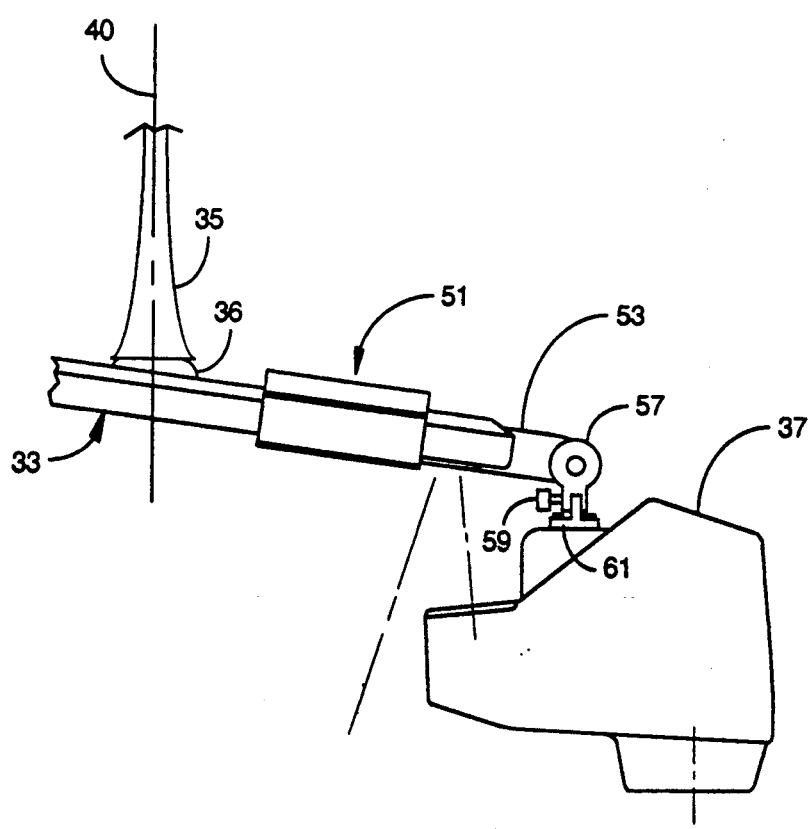
FIG. 4 is a plan view showing a device mounted using the apparatus according to FIG. 3.

FIG. 4 is a plan view of the embodiment shown by FIG. 3 showing a Magniscope 37 attached to rocking arm 61. In this embodiment there are sufficient degrees of freedom to position the Magniscope to be level, as required, and to adjust the aim to select different fields to the rear. To do so requires (after the mirror position is adjusted to the driver's requirement), both rotating clamp 57 about post 55, which may not be vertical, and rotating rocker arm 61 about the axis of clamp screw 59.

Figure 5:
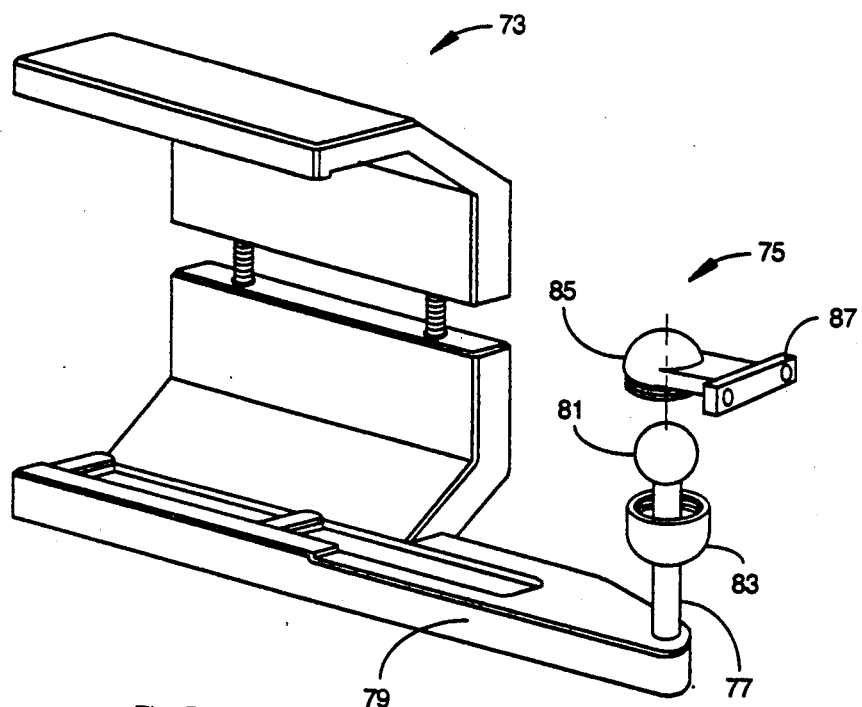
FIG. 5 is a perspective view showing an apparatus according to the invention with a ball joint on a post for mounting a device.

FIG. 5 shows yet another apparatus according to an alternative preferred embodiment of the invention incorporating a ball joint mechanism 75 positioned on a post 77 attached to a support extension 79 extending from a lower portion of a clamp. The ball joint mechanism has a ball 81 on post 77, a ball nut 83, and a ball cap 85 with a mounting pad 87 for attaching to a Magniscope or other complementary device. A person with skill in the art will recognize that there are many equivalent ways that a ball joint may be provided on the post and attached to a complementary device such as the Magniscope. With the apparatus of FIG. 5, the mirror can be adjusted to the requirements of the driver, and the Magniscope can then be positioned properly without altering the mirror adjustment.

Figure 6:
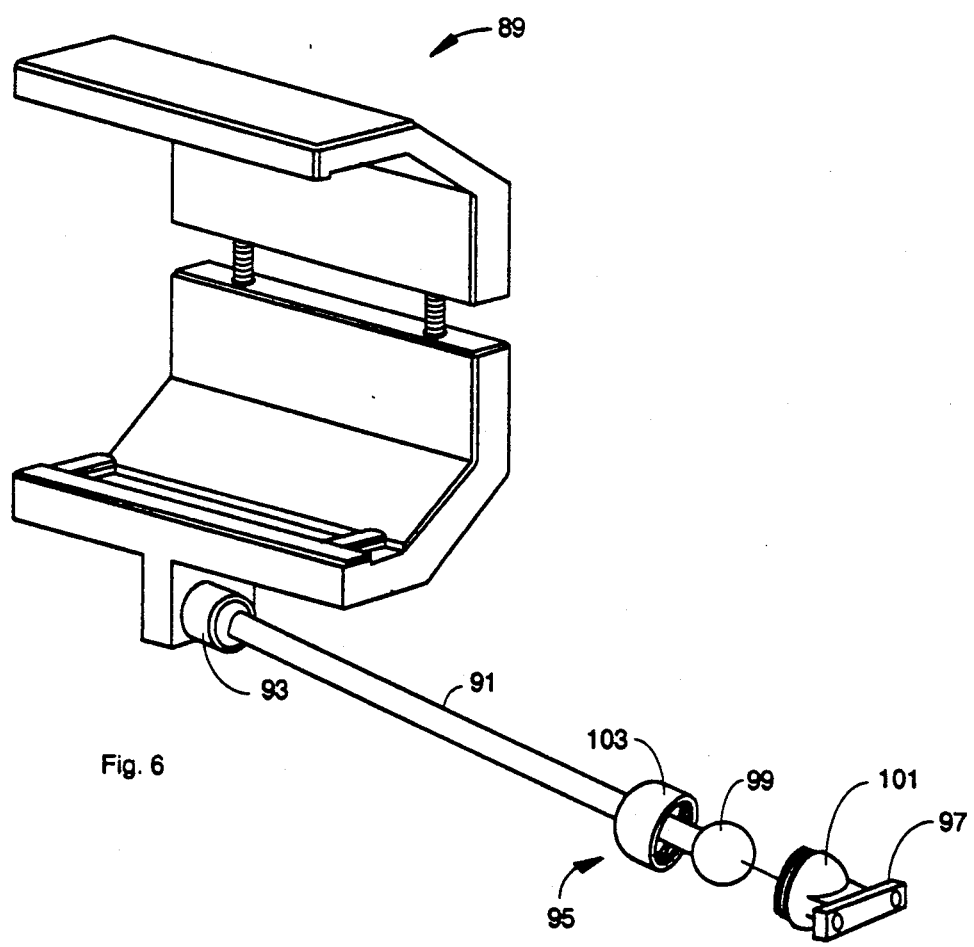
FIG. 6 is a perspective view showing an apparatus according to a preferred embodiment using two ball joints.

FIG. 6 shows yet another apparatus 89 according to an alternative preferred embodiment of the invention. Mounting apparatus 89 has a support arm 91 extending from a first ball joint 93 attached to a portion of the clamp and a second ball joint 95 at the opposite end of the support arm. The second ball joint has a mounting pad 97 for mounting a Magniscope or other complementary device. Ball joint 95 is shown exploded in FIG. 6 to illustrate a ball 99, a cap 101, and a nut 103. The cap has a mounting pad 97 for attaching to a Magniscope or other complementary device.

The apparatus of FIG. 6 has a particular advantage in that the support arm can be swivelled at the first ball joint to move a mounted device away from the passenger side visor to allow the visor to be adjusted. The first ball joint is shown in FIG. 6 attached to the lower portion of the clamp, but could also be attached to the upper portion, and could be attached to either portion at other positions than at the center of the portion.

In the embodiments described above, the clamp is designed to engage the rear-view mirror at one side of the adapter by which the mirror mounts to an inside surface of the vehicle, such as the inside of the windshield. In all of these embodiments, the clamp may also be configured to span the mirror's adapter. Spanning the center adapter of the mirror has the advantage of reducing the cantilevered weight on the mirror, which in some cases provides a more stable mounting.

Figure 7:
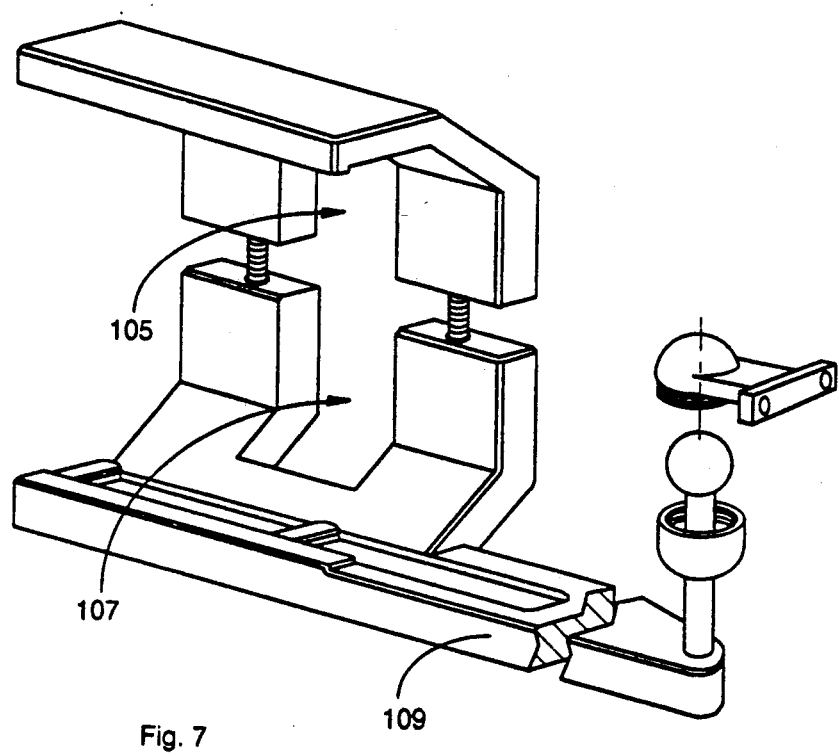
FIG. 7 is a perspective view showing an apparatus according to a preferred embodiment with a clamp configured to span the adapter for a rear-view mirror.

FIG. 7 shows the mounting apparatus of FIG. 5 with openings 105 and 107 in the upper and lower portions respectively of the clamp, so the clamp can mount to the mirror by spanning the center adapter for the mirror. The apparatus of FIG. 7 has a support arm 109 shown broken, because a longer support arm is needed with the center mounting. Also, when configured to span the center adapter for the rear-view mirror, the opening to clear the adapter needs to have about one-half inch clearance on each side (openings 105 and 107 need to provide sufficient clearance) so the apparatus can be moved along the mirror in each direction left and right, to aid in positioning the magnified image on the rear-view mirror for a particular driver.

Figure 8:
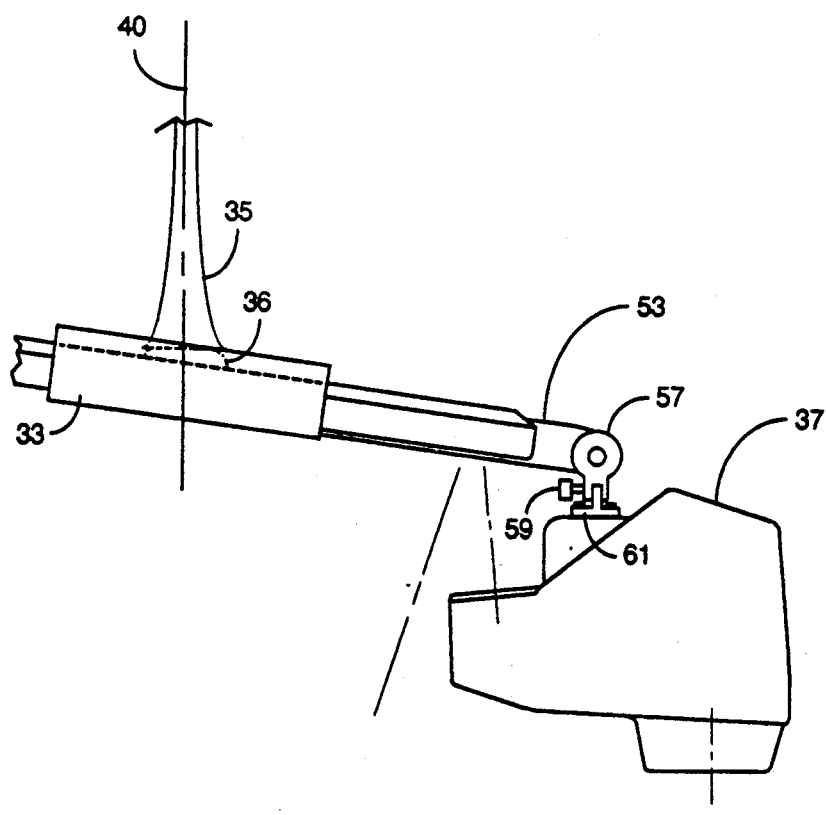
FIG. 8 is a plan view showing the apparatus of FIG. 7 mounted to a rear-view mirror.

FIG. 8 is a top view of an apparatus similar to the apparatus of FIGS. 3 and 4, but having a clamp configured to span the center adapter and a support arm 111 longer than the support arm 53 of the apparatus of FIG. 3.

Figure 9:
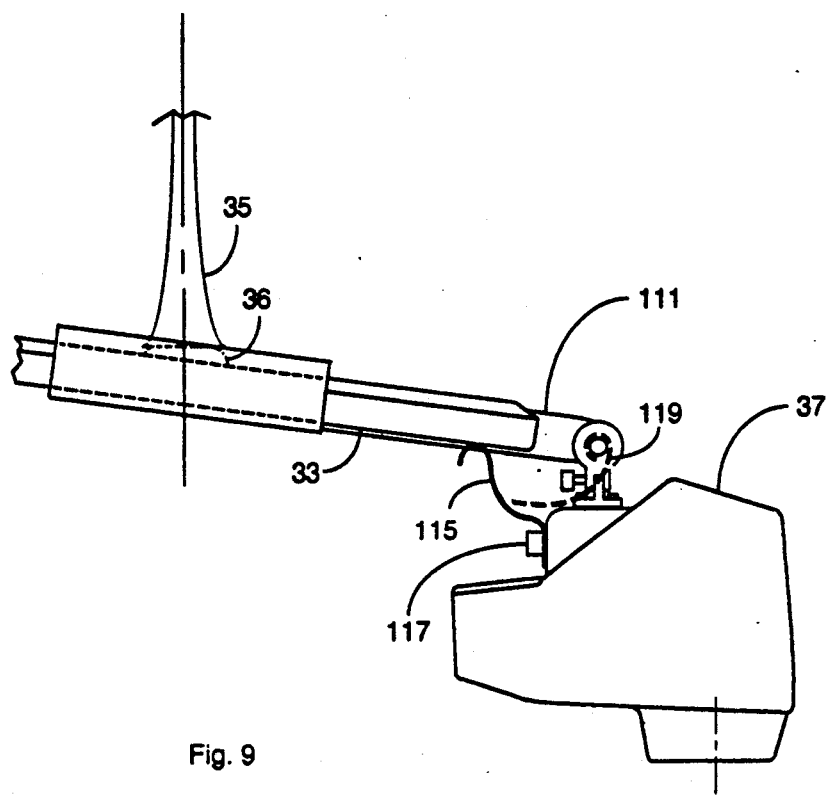
FIG. 9 is a plan view showing the use of resilient springs to dampen vibration in an embodiment of the invention.

In building and testing apparatus according to the invention it has been found that preloading is useful to dampen vibration. FIG. 9 is a plan view of a mounting apparatus according to the invention with a leaf spring 115 to preload the assembly to dampen vibration. The leaf spring, also called a whisker, is fixedly mounted to the complementary device 37 such as by a fastener 117. Alternatively, the leaf spring may be mounted to the mounting post as shown in dotted outline 119. The free end of the leaf spring urges against the front surface of the glass reflector of the rear-view mirror, providing a force to dampen vibration that tends to blur the image.

It has also been found to be helpful to be able to adjust the force exerted by the spring. In the case of fastening the spring to the complementary device such as by a fastener 117, the spring can be slotted where the fastener penetrates the spring so the spring position can be moved to adjust the preloading. In the case of mounting the leaf spring to the post, there are a number of alternative ways that the rotative position of the spring relative to the post can be adjusted and held after adjustment. The spring can be mounted to a cylinder with a set screw, for example.

There are also many other ways to preload the assembly other than by providing a leaf spring. Coil springs can be used, for example, and flexible members made of rubber-like materials.

Figure 10:
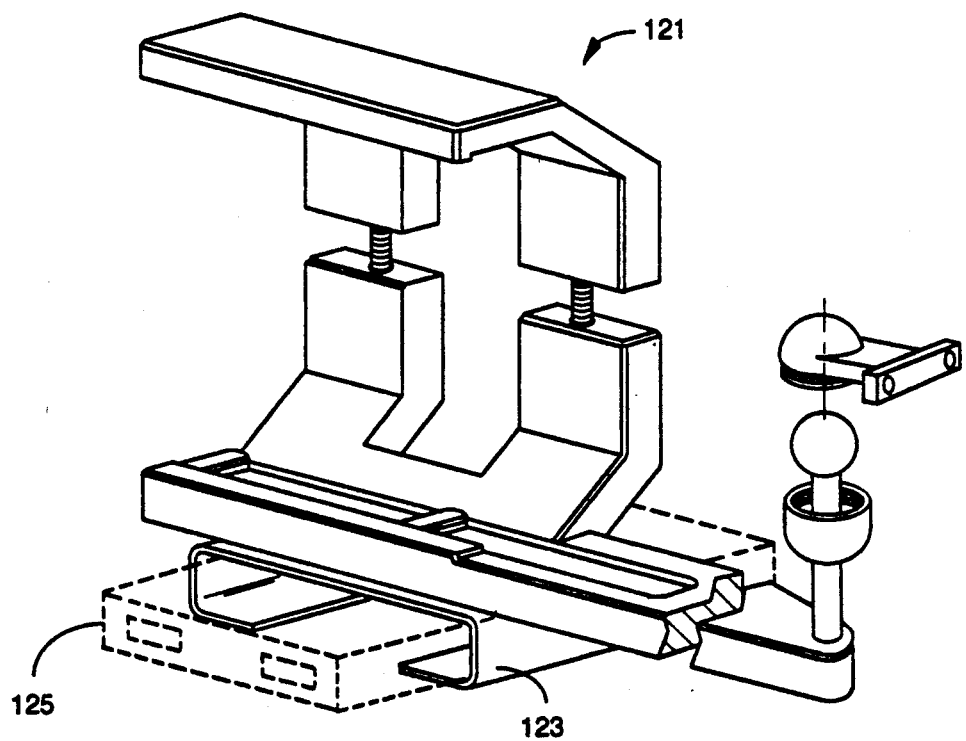
FIG. 10 is a perspective view showing a holder for a radar detector mounted to the apparatus of the invention.

FIG. 10 is a perspective view showing another alternative preferred embodiment 121 of the invention. In this embodiment a rotatable holder 123 is attached to the underside of the lower portion of the clamp by a single fastener (not shown) such that the holder may be rotated about a vertical axis as center of rotation. The rotatable holder is for holding a radar detector 125 shown in dotted outline. By rotating the holder the radar detector can be aimed to the front of the vehicle in an adjustable line. The radar detector, the rear magnifier, and the rear-view mirror may be aimed to provide maximum utility for each. There are, of course, a number of equivalent ways that a holder for a radar detector may be attached, and there are many ways that a holder may be constructed to hold a detector. For example, the holder may also be joined to the clamp member by a universal joint, such as a ball joint, so the direction of the radar detector may be adjusted independently of the position of the rear-view mirror.

Figure 11:
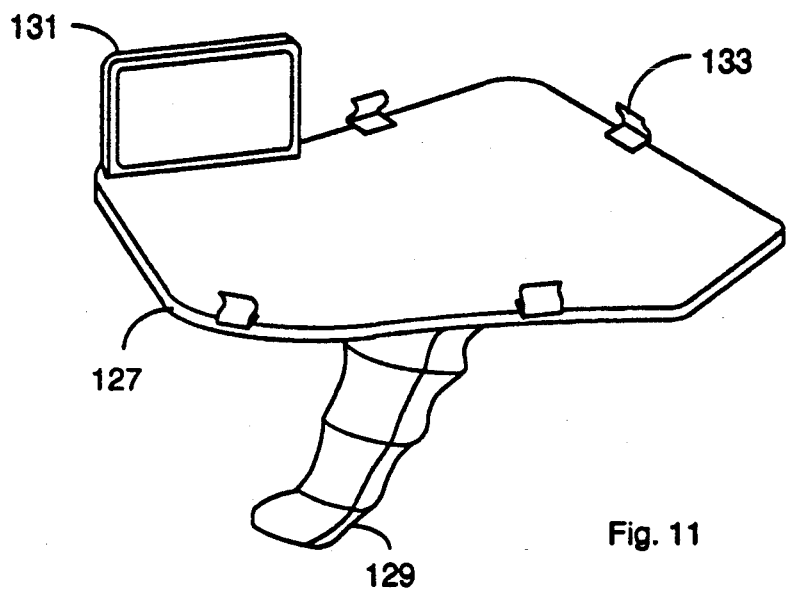
FIG. 11 shows a platform with a handle and auxiliary mirror according to an alternative preferred embodiment of the invention.
Figure 12:
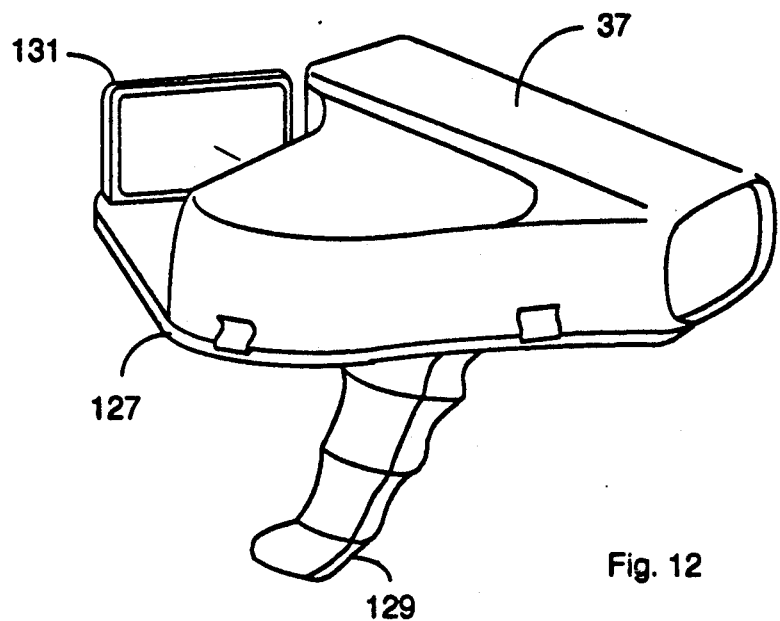
FIG. 12 shows the embodiment of FIG. 11 with a device mounted to the platform.

FIG. 11 shows an alternative preferred embodiment of the invention that does not attach to a rear-view mirror. In this embodiment a platform 127 has a handle 129 mounted to the underside and a mirror 131 mounted to the topside. The platform also has mounting clips such as clip 133 attached to the topside by conventional fasteners, for holding a Magniscope. FIG. 12 shows a Magniscope mounted to the platform. In this embodiment of the invention a Magniscope of the same type and manufacture that is mounted to the mounting apparatus in the other embodiments may also be mounted to platform 127.

It will be apparent to one with skill in the art that there are many equivalent ways a Magniscope may be mounted to the platform, such as with conventional fasteners such as screws. The mounting clips shown in FIG. 11 are convenient. The platform could also be provided with a post, and the Magniscope mounted to the post similar to mountings shown in other embodiments. An advantage of the embodiment shown in FIGS. 11 and 12 is that the device may be conveniently stored on the seat next to the driver, in a rack (not shown) on or under the dashboard, or even in the glove box. The driver can pick up the device when needed and hold it to view a magnified image to the rear.

Figure 13:
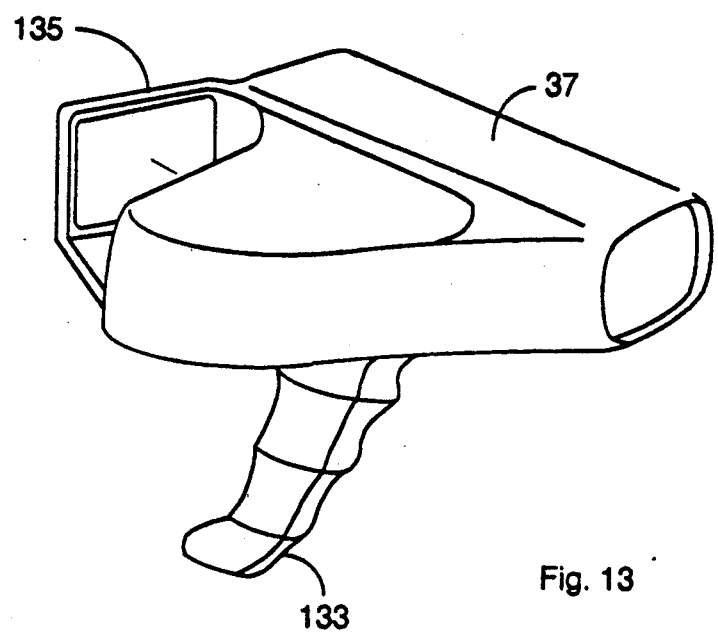
FIG. 13 shows an embodiment similar to that of FIG. 11 and 12 using the case of the mounted device.

FIG. 13 shows yet another embodiment of the invention in which the hand-held mounting is a part of the case of the Magniscope. Handle 133 may be attached to the case of the Magniscope by fasteners or integrally molded. Mirror 135 is similarly attached to the case or a mounting for the mirror may be integrally molded to the case.

Figure 14:
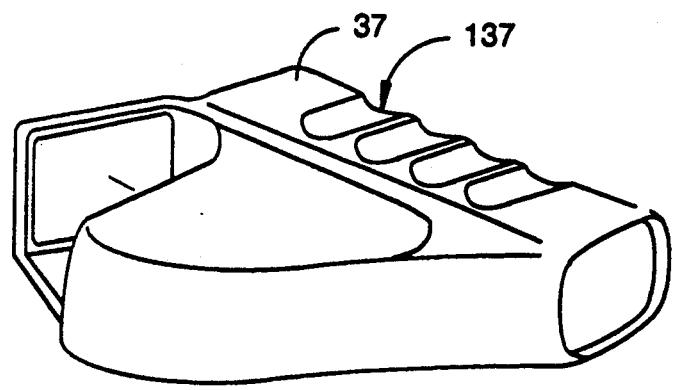
FIG. 14 shows a hand-held device according to a preferred embodiment of the invention.

FIG. 14 shows another preferred embodiment similar to the embodiment of FIG. 13, but eliminating the handle. In the embodiment shown by FIG. 14, a user holds the Magniscope in a hand much as one holds a camcorder, grasping the case by area 137. The case may be molded to provide a comfortable and secure grip. The protruding handle is in some cases convenient, but not really needed, and the device is more compact and storable without the handle.

A person will skill in the art will recognize that there are many variations that may be made without departing from the spirit and scope of the invention. Some of these variations have already been mentioned, such as several different ways that the assembly may be preloaded to dampen vibration effects. The apparatus of the invention may vary considerably from the dimensions described, and there is a wide choice of suitable materials that may be used for the different elements of the invention. There are similarly many other variations that do not depart significantly from the spirit and scope of the invention.

What is claimed is:

1. An apparatus for mounting a device to a rear-view mirror for a vehicle comprising:

adjustably opposed clamp means for clamping said apparatus to said rear-view mirror, said clamp means comprising an upper portion for engaging the top of said rear-view mirror and a lower portion for engaging the bottom of said rear-view mirror; and support means extending from said clamping means for supporting a pivotal mounting means for mounting said device, said pivotal mounting means secured to the end of said support means away from said clamp means; and preloading means for applying a force to a surface of said rear-view mirror.

2. An apparatus as in claim 1 wherein the force applied to said rear-view mirror by said preloading means is an adjustable force.

3. An apparatus as in claim 1 wherein said preloading means comprises a leaf spring with a first end fixedly attached to said apparatus and a second end urging against said surface of said rear-view mirror.

4. An apparatus as in claim 3 wherein said preloading means comprises a leaf spring with a first end fixedly attached to said device and a second end urging against said surface of said rear-view mirror.

5. An apparatus as in claim 3 wherein said first end of said leaf spring is configured to rotatably engage said pivotal mounting means and comprising a locking means to secure said first end after adjustment of preload force.

6. An apparatus as in claim 3 wherein said first end of said leaf spring is slotted to allow adjustment of the position of said leaf spring relative to said apparatus to vary the force applied to said rear-view mirror.

7. An apparatus as in claim 3 wherein said first end of said leaf spring is slotted to allow adjustment of the position of said leaf spring relative to said device to vary the force applied to said rear-view mirror.

8. A method of preloading an assembly to dampen vibration, said assembly comprising a mounting apparatus clamped to a rear-view mirror for mounting a complementary device to said rear-view mirror, said method comprising imposing a resilient member between a portion of said apparatus and said rear-view mirror to apply a force between the apparatus and the rear-view mirror, wherein said resilient member comprises a spring.

* * * * *